US012798409B2

(12) United States Patent
Watanabe

(10) Patent No.: US 12,798,409 B2
(45) Date of Patent: Nov. 17, 2026

(54) CONTROLLER FOR ROTATING ELECTRICAL MACHINE AND PROGRAM

(71) Applicant: DENSO CORPORATION, Kariya-city (JP)

(72) Inventor: Kazunori Watanabe, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 19/291,094

(22) Filed: Aug. 5, 2025

(65) Prior Publication Data

US 2025/0353389 A1 Nov. 20, 2025

Related U.S. Application Data

(63) Continuation of application No. PCT/JP2024/006215, filed on Feb. 21, 2024.

(30) Foreign Application Priority Data

Mar. 20, 2023 (JP) ................................ 2023-044200

(51) Int. Cl.

*B60L 53/14* (2019.01)
*B60L 15/00* (2006.01)
*B60L 15/20* (2006.01)
*H02P 27/06* (2006.01)

(52) U.S. Cl.

CPC ............ *B60L 53/14* (2019.02); *B60L 15/007* (2013.01); *B60L 15/20* (2013.01); *H02P 27/06* (2013.01); *B60L 2240/42* (2013.01); *B60L 2260/40* (2013.01)

(58) Field of Classification Search

None
See application file for complete search history.

(56) References Cited

U.S. PATENT DOCUMENTS

| | | | | |
|---|---|---|---|---|
| 2021/0288604 | A1* | 9/2021 | Kondo | B60L 3/003 |
| 2022/0360183 | A1* | 11/2022 | Xu | B60L 53/22 |
| 2023/0006437 | A1* | 1/2023 | Xu | H02P 29/024 |
| 2024/0106367 | A1 | 3/2024 | Tani | |

FOREIGN PATENT DOCUMENTS

| | | | |
|---|---|---|---|
| JP | 2010-045961 | A | 2/2010 |
| JP | 2010-051092 | A | 3/2010 |
| JP | 2021-180583 | A | 11/2021 |
| JP | 2022-118417 | A | 8/2022 |

* cited by examiner

*Primary Examiner* — Regis J Betsch
*Assistant Examiner* — Joel Barnett
(74) *Attorney, Agent, or Firm* — Oliff PLC

(57) ABSTRACT

A control apparatus includes an energy storage device, an inverter connected to the energy storage device, and a rotating electrical machine equipped with armature windings connected to the inverter. The control apparatus includes a switching power supply equipped with a switch and works to control a switching operation thereof to output a load current. The control apparatus is configured to use the load current to perform a plurality of control functions to control an operation of the machine. The apparatus also includes a restriction unit which performs a restriction task to restrict at least one of the control functions in response to a determination that an external charging control mode is entered which electrically charges the energy storage device using an external power supply or that an external power feeding control mode is entered which feeds electrical energy from the energy storage device to an external power receiving target.

14 Claims, 6 Drawing Sheets

CONTROLLER FOR ROTATING ELECTRICAL MACHINE AND PROGRAM

CROSS REFERENCE TO RELATED DOCUMENT

The present application claims the benefit of priority of Japanese Patent Application No. 2023-044200 filed on Mar. 20, 2023, the disclosure of which is incorporated in its entirety herein by reference.

TECHNICAL FIELD

This disclosure generally relates to a control apparatus and a program for use with a system which includes an electrical power storage unit, an inverter connecting with the electrical power storage unit, and a rotating electrical machine equipped with armature windings leading to the inverter.

BACKGROUND ART

A control device is known for the above-described type of rotating electrical machine which includes a switching power supply for supplying power to drive circuits for upper and lower arm switches of an inverter. The control device intermittently operates the switching power supply during external charging control in which a power storage unit is charged from an external power source. In this manner, the control device aims to reduce noise generated due to switching control of the switching power supply. An example of such a technique is disclosed in the following first patent literature.

PRIOR ART DOCUMENT

Patent Literature

FIRST PATENT LITERATURE: Japanese Patent First Publication No. 2022-118417

SUMMARY OF THE INVENTION

During external charging control of a power storage unit from an external power source, there is a concern that noise may be generated due to the output of a load current from a switching power supply to a drive circuit. For example, when the switching power supply operates intermittently, although the output of the load current is suspended during the non-operating period, noise may be generated during the operating period due to the output of the load current.

It should be noted that a power supply target to which the load current produced by the switching power supply is supplied is not limited to the drive circuit for switches installed in the inverter, and similar problems may also occur in other electrical loads.

It is an object of the present disclosure to provide a control apparatus and a program for a rotating electrical machine, which are capable of reducing noise generated due to the flow of a load current produced by a switching power supply.

According to one aspect of this disclosure, there is provided a control apparatus for use in a system which includes an energy storage device, an inverter connected to the energy storage device, and a rotating electrical machine equipped with armature windings connected to the inverter. The control apparatus comprises: (a) a switching power supply which is equipped with a switch and works to control a switching operation of the switch to output a load current; and (b) a restriction unit. The control apparatus uses, as a power source, the load current delivered from the switching power supply to perform a plurality of control functions to control an operation of the rotating electrical machine. The control apparatus also includes a restriction unit which works to perform a restriction task to restrict at least one of the control functions in response to a determination that an external charging control mode is entered which electrically charges the energy storage device using an external power supply located outside the system or that an external power feeding control mode is entered which feeds electrical energy from the energy storage device to an external power receiving target located outside the system.

The control apparatus is configured to operate the control functions for the rotating electrical machine by utilizing the load current supplied from the switching power supply. However, in such a configuration, there is a possibility that noise may be generated as a result of the load current flowing through the switching power supply.

It may be unnecessary to maintain the operation of the control functions used for controlling the rotating electrical machine during execution of the external charging control or the external power supply control.

In order to alleviate the above problem, the control apparatus in this disclosure works to restrict at least a portion of the control functions when it is determined that the external charging control mode is entered or that the external power feeding control mode is entered. This results in a decrease in amount of the load current delivered from the switching power supply, thereby reducing electrical noise arising from the flow of the load current.

BRIEF DESCRIPTION OF THE DRAWINGS

The above-described object, other objects, features, or beneficial advantages in this disclosure will be apparent from the following detailed discussion with reference to the drawings.

In the drawings.

MODE FOR CARRYING OUT THE INVENTION

First Embodiment

The first embodiment of a control apparatus for a rotating electrical machine according to the present disclosure will be described with reference to the drawings. The control apparatus for the rotating electrical machine in the present embodiment is mounted in an electric vehicle or a hybrid vehicle, which is a type of electric-powered vehicle.

Figure 1:
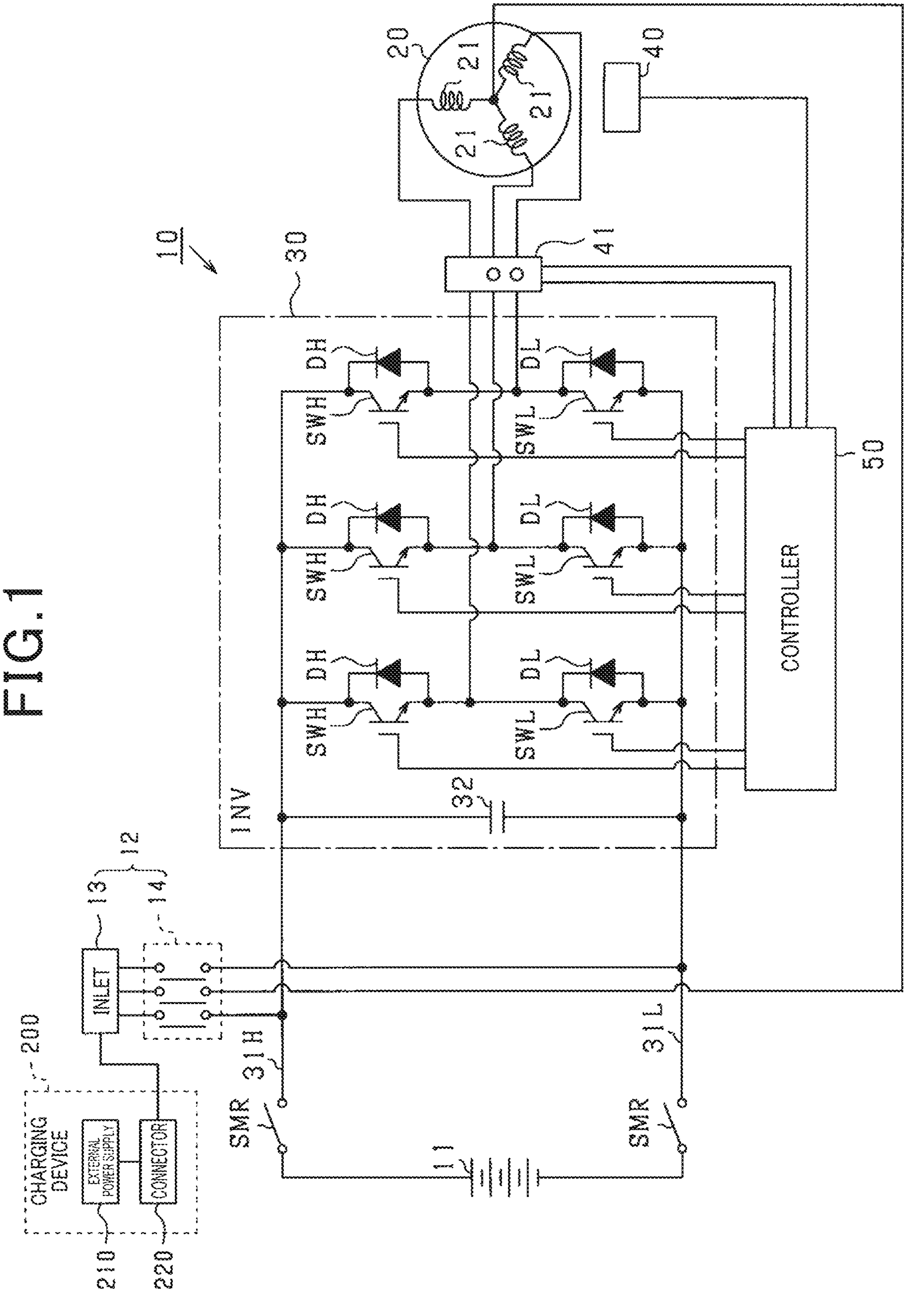
FIG. 1 is an overall configuration diagram of a control system according to the first embodiment.

The control system 10, as illustrated in FIG. 1, includes the high-voltage battery 11 (which will also be referred to below as an energy storage device), the rotating electrical machine 20, and the inverter 30. The high-voltage battery 11 is a rechargeable secondary battery and has, for example, a terminal voltage of 100V or higher. The high-voltage battery 11 may be a lithium-ion battery or a nickel-metal hydride battery.

The rotating electrical machine 20 serves as a main vehicle-mounted power unit, and includes a rotor which transmits power to drive wheels of the vehicle. In this embodiment, the rotating electrical machine 20 includes the armature windings 21 for three phases, which are star-connected as stator windings. The rotating electrical machine 20 is, for example, a permanent magnet synchronous machine.

The inverter 30 functions as a power conversion circuit that converts direct current power supplied from the high-voltage battery 11 into three-phase alternating current power by switching operations, and supplies the converted AC power to the rotating electrical machine 20. The inverter 30 includes three series-connected assemblies for three phases. Each of the series-connected assemblies includes an upper-arm switch SWH and a lower-arm switch SWL which are connected in series with each other. Each of the switches SWH and SWL is made of a voltage-controlled semiconductor switching device, and more specifically, an Insulated Gate Bipolar Transistor (IGBT). Freewheeling diodes (which will also be referred to below as an upper-arm diode DH and a lower-arm diode DL, are connected in reverse parallel to the upper and lower arm switches SWH and SWL, respectively. The switches of the inverter 30 may alternatively be N-channel Metal Oxide Semiconductor Field Effect Transistors (MOSFETs) instead of IGBTs.

A collector, which is a high-potential terminal of each upper-arm switch SWH, is connected to a positive terminal of the high-voltage battery 11 using the positive bus bar 31H. An emitter, which is a low-potential terminal of each lower-arm switch SWL, is connected to a negative terminal of the high-voltage battery using the negative bus bar 31L. A junction or connection point between each of the upper-arm switches SWH and a corresponding one of the lower-arm switches SWL is connected to a first end of a corresponding one of the armature windings 21. The armature windings 21 have second ends for the respective phases which are connected to each other at a neutral point.

The power switch SMR (i.e., a main system relay) is disposed on each of the positive bus bar 31H and the negative bus bar 31L. When the power switches SMR are turned on, the high-voltage battery 11 is electrically connected to the inverter 30. Alternatively, when the power switches SMR are turned off, the electrical connection between the high-voltage battery 11 and the inverter 30 is interrupted. Each of the power switches SMR are driven by the controller 50 installed in the control system 10, but may alternatively be driven by an upper-level control device, i.e., a primary or upper ECU 42 (see FIG. 2), which issues commands to the controller 50.

The inverter 30 includes the smoothing capacitor 32. The smoothing capacitor 32 electrically connects a portion of the positive bus bar 31H that is located closer to the inverter 30 than to the power switch SMR and a portion of the negative bus bar 31L that is located closer to the inverter 30 than to the power switch SMR. The smoothing capacitor 32 may be provided inside the inverter 30, or alternatively, may be provided outside the inverter 30.

The control system 10 includes the angle sensor 40 and the current sensor 41. The angle sensor 40 outputs an angle signal indicative of an electrical angle of the rotating electrical machine 20. The angle sensor 40 is made of a resolver. The current sensor 41 works to measure at least two phase currents that are electrical currents following in at least two of the armature windings 21 of the rotating electrical machine 20 and generate current signals indicative thereof. The angle signal from the angle sensor 40 and the current signals from the current sensor 41 are input to the controller 50.

Next, an external charging structure of components installed in the control system 10 will be described below.

The control system 10 includes the external charging mechanism 12. The external charging mechanism 12 includes the inlet 13 and the relay 14. The inlet 13 is connected, via the relay 14, to a portion of each of the bus bars 31H and 31L located between the high-voltage battery 11 and the inverter 30, and to the neutral point of the armature windings 21.

External charging is performed when the inlet 13 is electrically connected to the charging device 200. The charging device 200 includes the external power supply 210 and the connector 220. The connector 220 is configured to be connectable to the inlet 13 of the vehicle. The external power supply 210 includes a direct current (DC) power supply, but may alternatively be implemented by an alternating current (AC) power supply. In the latter case, an AC/DC converter is required.

Figure 2:
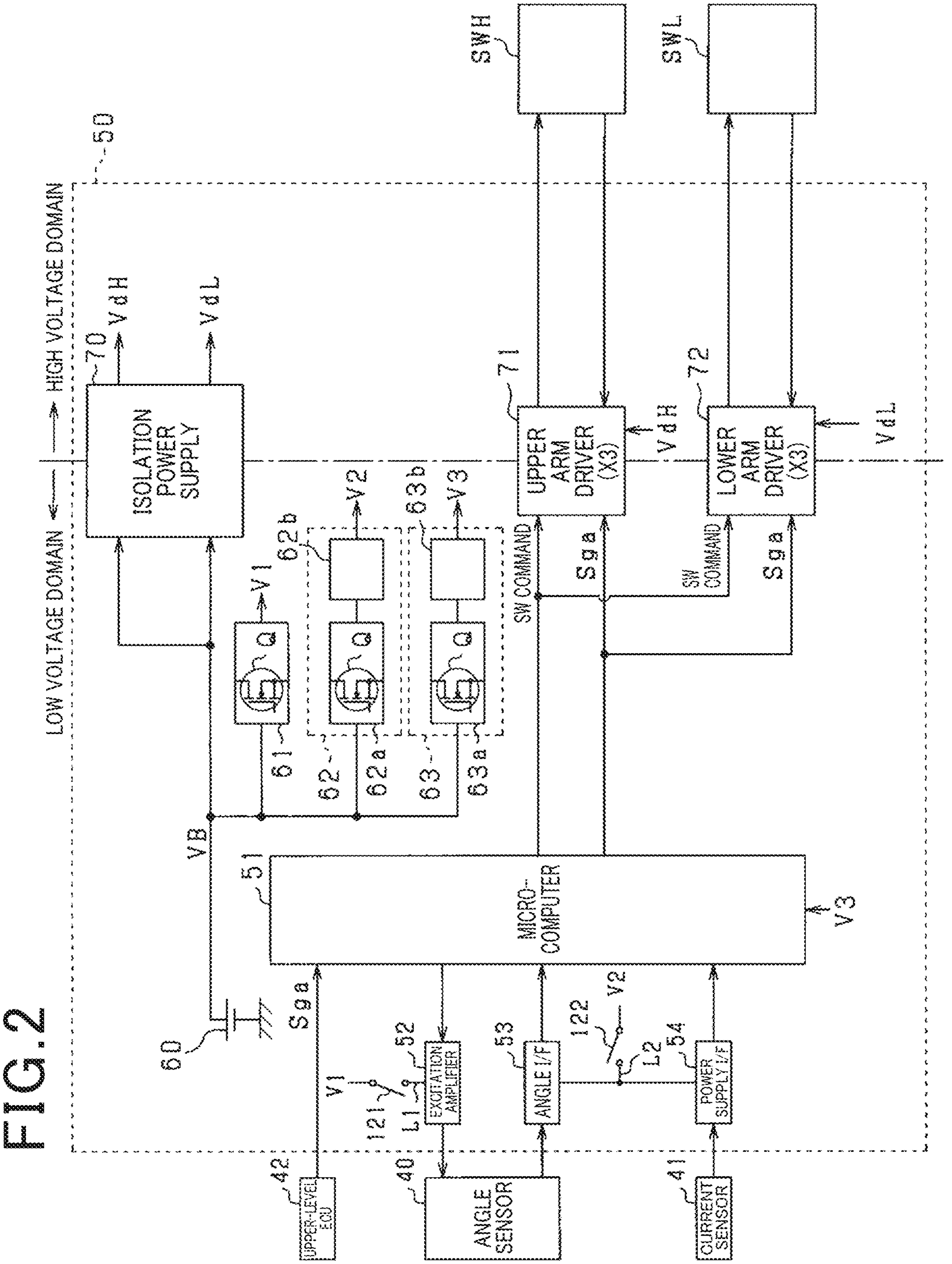
FIG. 2 is a diagram illustrating a control device and its peripheral configuration.

Referring to FIG. 2, the configuration of the controller 50 will be described. The controller 50 includes the microcomputer 51. The microcomputer 51 is configured to perform a drive control task for the rotating electrical machine 20 for moving the vehicle, an external charging control task, and an external power feeding control task. The microcomputer 51 includes an A/D converter configured to receive outputs from sensors 40 and 41.

The drive control task for the rotating electrical machine 20 is to regulate a control variable (e.g., torque) of the rotating electrical machine 20 to a target value, and is implemented by switching control of the switches SWH and SWL installed in the inverter 30. The microcomputer 51 is configured to generate switching commands for alternately turning on the switches SWH and SWL in order to perform the drive control task. In other words, the microcomputer 51 implements a function of generating commands for the switches SWH and SWL. Each switching command is either an ON command or an OFF command.

The external charging control task is to electrically charge the high-voltage battery 11 using the charging device 200 through the external charging mechanism 12 while the vehicle is in a stationary state (which will also be referred to below as an external charging control mode). The external power feeding control task is to supply electrical energy or power from the high-voltage battery 11 to an external power receiving target existing outside the control system 10 using the external charging mechanism 12 while the vehicle is stopped (which will also be referred to below as an external power feeding control mode). When the external power receiving target is an electrical appliance in a building such as a residence, the external power feeding control task is also referred to as Vehicle-to-Home (V2H). When the external power receiving target is the external power source 210 such as a grid power supply, the external power feeding control task is also referred to as Vehicle-to-Grid (V2G).

FIG. 1 demonstrates a circuit structure in which the external charging and power feeding control tasks can be executed with the neutral point of the armature windings 21 electrically connected to the inlet 13 through the relay 14. However, such a structure is not essential. In the following description of the present embodiment, cases will be described in which the external charging control task or the external power feeding control task is performed with the positive bus bar 31H and the negative bus bar 31L electrically connected to the inlet 13 via the relay 14.

The upper-level ECU 42 determines whether the vehicle is in a state in which external charging or power feeding is possible, and outputs a vehicle-state signal Sga indicative of a result of such a determination. The vehicle-state signal Sga indicates that the vehicle is in a state allowing external charging or power feeding when the vehicle-state signal Sga is at a high level (Hi level), while it indicates that the vehicle is in a normal state when the vehicle-state signal Sga is at a low level (Low level). Specifically, when the upper-level ECU 42 determines that a vehicle-side connector (i.e. the inlet 13) is now connected to the external connector 220 of the external charging mechanism 200, it outputs the high level of the vehicle-state signal Sga. Alternatively, when it determines that the vehicle-side connector (i.e., the inlet 13) and the external connector 220 are not connected together, it outputs the Low level of the vehicle-state signal Sga.

The microcomputer 51 acquires the vehicle-state signal Sga from the upper-level ECU 42. When the microcomputer 51 determines that the acquired vehicle-state signal Sga is at the high level, it determines that either the external charging control task or the external power feeding control task is being executed. In this embodiment, during execution of external charging control task or the external power feeding control task, the microcomputer 51 keeps the power switches SMR in the on-state. Alternatively, when the microcomputer 51 determines that the acquired vehicle-state signal Sga is at the low level, it performs the drive control task for the rotating electrical machine 20.

The microcomputer 51 and a microcomputer installed in the upper-level ECU 42 each comprise a processor, specifically a CPU. Functions provided by each microcomputer may be implemented by software recorded on a non-transitory tangible memory device, by software alone, by hardware alone, or by a combination thereof. For example, when the functions are implemented by hardware, they may be provided by a digital circuit including a plurality of logic circuits, or by an analog circuit. Each microcomputer executes a program stored in a non-transitory tangible storage medium serving as its storage unit. The program includes, for example, processing such as that shown in FIG. 5, which will be described later. When the program installed in each microcomputer is executed, a corresponding method is carried out. The storage unit may be, for example, a non-volatile memory. The program stored in the storage unit may be downloaded and updated via a communication network such as the Internet, for example, by Over-The-Air (OTA) technology.

The controller 50 includes the excitation amplifier 52, the angle interface circuit 53, and the current interface circuit 54. The microcomputer 51 generates a sinusoidal excitation signal and outputs it to the excitation amplifier 52. The excitation amplifier 52 amplifies the excitation signal inputted from the microcomputer 51, and supplies the amplified excitation signal to a resolver stator constituting the angle sensor 40. The resolver stator of the angle sensor 40 works to modulate the excitation signal as a function of an electrical angle of the rotating electrical machine 20. The resolver stator then outputs the modulated excitation signal in the form of an angle signal. The angle signal outputted from the resolver stator is inputted to the angle interface circuit 53. The angle interface circuit 53 converts the angle signal into a signal format suitable for input to the microcomputer 51, and outputs the converted angle signal to the microcomputer 51. The microcomputer 51 analyzes the angle signal received from the angle interface circuit 53 and calculates an electrical angle of the rotating electrical machine 20 as a function of the angle signal (i.e., the electrical angle of the rotating electrical machine 20).

The current signal outputted from the current sensor 41 is inputted to the current interface circuit 54. The current interface circuit 54 converts the current signal into a signal format suitable for input to the microcomputer 51, and outputs it to the microcomputer 51. The microcomputer 51 calculates a phase current as a function of the signal input from the current interface circuit 54. The excitation amplifier 52, the angle interface circuit 53, and the current interface circuit 54 are installed in a low-voltage region of the controller 50.

The controller 50 includes first to third power supplies 61 to 63. The first to third power supplies 61 to 63 are provided in the low-voltage region of the controller 50. The control system 10 includes the low-voltage battery 60 (which will also be referred to below as an energy storage device). The low-voltage battery 60 is a storage battery whose output voltage (specifically, rated voltage) is lower than that of the high-voltage battery 11. The low-voltage battery 60 may be implemented by a lead-acid battery.

The first power supply 61 generates the first voltage V1 (for example, 30 V) by stepping-up the output voltage VB of the low-voltage battery 60. The first power supply 61 is connected to the excitation amplifier 52 through the first electrical path L1. The first voltage V1 from the first power supply 61 is supplied to the excitation amplifier 52. This enables the excitation amplifier 52 to deliver an amplified excitation signal to the resolver stator. It should be noted that the excitation amplifier 52 corresponds to an "excitation signal generator." In the present embodiment, the first power supply 61 is a step-up chopper-type switching power supply that includes a switch Q. The switch Q is a voltage-controlled semiconductor switch, and more specifically, an N-channel MOSFET. The first power supply 61 sets a duty factor of the switch Q so as to perform feedback control of the output voltage to the first voltage V1, and performs switching control of the switch Q based on the duty factor. The duty factor refers to a ratio of an ON duration to one switching cycle of the switch Q.

The second power supply 62 generates the second voltage V2 (for example, 5 V) by stepping down the output voltage VB of the low-voltage battery 60. The second power supply 62 is connected to the angle interface circuit 53 and the current interface circuit 54 via the second electrical path L2. The second voltage V2 from the second power supply 62 is supplied to the angle interface circuit 53 and the current interface circuit 54. This enables each of the interface circuits 53 and 54 to convert signals output from respective sensors 40 and 41 into signals that are inputtable to the microcomputer 51.

The third power supply 63 generates the third voltage V3 (for example, 1.5 V) by stepping down the output voltage VB developed at the low-voltage battery 60. The third voltage V3 from the third power supply 63 is supplied to the microcomputer 51. This enables the microcomputer 51 to execute various control operations.

The second power supply 62 includes the intermediate power supply 62_a_ and the downstream power supply 62_b_ following the intermediate power supply 62_a_. Similarly, the third power supply 63 includes the intermediate power supply 63_a_ and the downstream power supply 63_b_ following the intermediate power supply 63_a_. Each of the intermediate power supplies 62_a_ and 63_a_ of the power supplies 62 and 63 is implemented by a step-down chopper-type switching power supply including a switch Q. The intermediate power supply 62_a_ of the second power supply 62 steps down the output voltage VB of the low-voltage battery 60 to generate an intermediate voltage (for example, 6 V). The intermediate power supply 63_a_ of the third power supply 63 steps down the output voltage VB of the low-voltage battery 60 to generate an intermediate voltage (for example, 2.5 V). Each of the intermediate power supplies 62_a_ and 63_a_ is configured to perform feedback control of its output voltage to a corresponding one of the second and third voltages V2 and V3 by setting a duty factor of the switch Q and performing switching control of the switch Q based on the duty factor.

The downstream power supplies 62_b_ and 63_b_ of the respective power supplies 62 and 63 are linear regulators such as series regulators or shunt regulators. The downstream power supply 62_b_ of the second power supply 62 works to step down the intermediate voltage from the intermediate power supply 62_a_ to generate the second voltage V2. Similarly, the downstream power supply 63_b_ of the third power supply 63 works to step down the intermediate voltage from the intermediate power supply 63_a_ to generate the third voltage V3. It should be noted that the second and third power supplies 62 and 63 may be configured without including linear regulators.

The controller 50 includes the isolation power supply 70, the upper-arm drivers 71, and the lower-arm drivers 72. The isolation power supply 70, the upper-arm drivers 71, and the lower-arm drivers 72 are disposed across a boundary between a low-voltage domain and a high-voltage domain of the controller 50, with respective portions located in both the low-voltage and high-voltage domains. The upper-arm drivers 71 are provided one for each of the upper-arm switches SWH. Similarly, the lower-arm drivers 72 are provided one for each of the lower-arm switches SWL. Therefore, a total of six drivers 71 and 72 are provided. The isolation power supply 70 includes upper-arm isolation power supplies provided one for each of the three-phase upper-arm drivers 71, and a lower-arm isolation power supply commonly provided for the three-phase lower-arm drivers 72. It should be noted that the isolation power supply 70 may alternatively include lower-arm isolation power supplies one for each of the three-phase lower-arm drivers 72.

Figure 3:
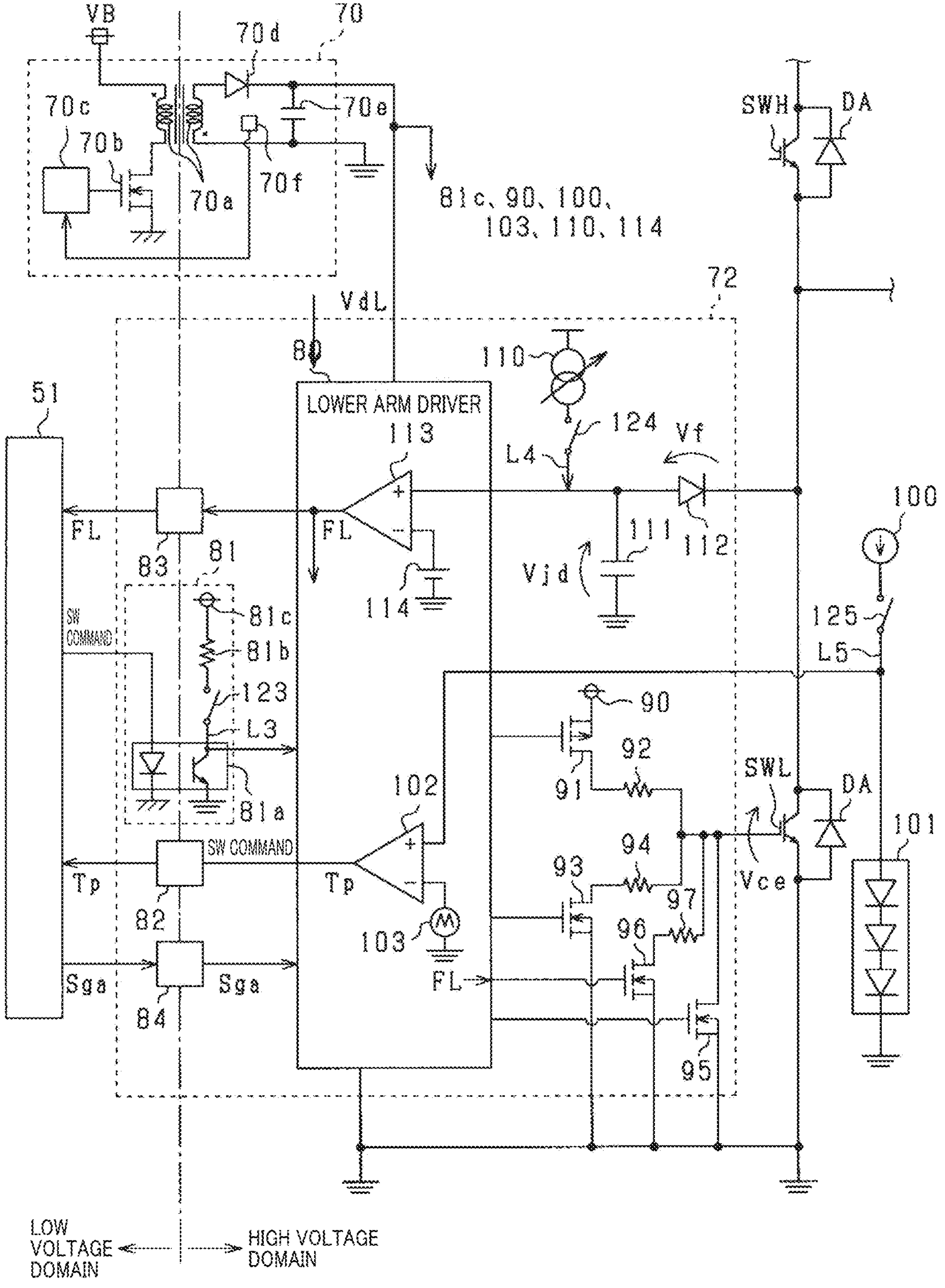
FIG. 3 is a diagram illustrating the configuration of a lower-arm driver.

FIG. 3 illustrates a configuration of the isolation power supply 70, using a lower-arm isolation power supply as an example. The isolation power supply 70 is a flyback-type switching power supply. The isolation power supply 70 includes the transformer 70_a_, the control switch 70_b_, the power supply controller 70_c_, the output diode 70_d_, the output capacitor 70_e_, and the output voltage detector 70_f_. The control switch 70_b_ is a voltage-controlled semiconductor switch, and specifically, an N-channel MOSFET.

The transformer 70_a_ includes a primary winding and a secondary winding, with the respective windings being magnetically coupled via a common core. A first end of the primary winding of the transformer 70_a_ is connected to the positive terminal of the low-voltage battery 60, and a second end of the primary winding is connected to the drain of the control switch 70_b_. The source of the control switch 70_b_ is grounded in the low-voltage domain. A first end of the secondary winding of the transformer 70_a_ is connected to the anode of the output diode 70_d_, and a second end of the secondary winding is connected to emitters of the lower-arm switches SWL. The cathode of the output diode 70_d_ and the second end of the secondary winding of the transformer 70_a_ are connected together using the output capacitor 70_e_. A voltage across the output capacitor 70_e_ is supplied to the lower-arm drivers 72 as a lower-arm drive voltage VdL.

The output voltage detector 70_f_ measures a voltage appearing across the output capacitor 70_e_ and transmits it to the power supply controller 70_c_. The power supply controller 70_c_ works to turn on or off the control switch 70_b_ to bring the output from the output voltage detector 70_f_ into agreement with a target value in a feedback mode. Specifically, the power supply controller 70_c_ sets a duty factor, which is a ratio of an ON duration to one switching cycle of the control switch 70_b_.

Structures of the upper- and lower-arm drivers 71 and 72 and operations thereof will be described below. The upper- and lower-arm drivers 71 and 72 each have: a drive function for driving the upper-arm switches SWH and the lower-arm switches SWL, respectively; an off-hold function for maintaining the upper-arm switches SWH and the lower-arm switches SWL in an off state; a temperature measuring function for detecting the temperature of the upper-arm switches SWH and the lower-arm switches SWL; an abnormality detection function for detecting an overcurrent abnormality of the upper-arm switches SWH and the lower-arm switches SWL; and a protection function for protecting the upper-arm switches SWH and the lower-arm switches SWL when the overcurrent abnormality occurs. The structure and operation of each of the lower-arm drivers 72 will be described below in detail with reference to FIG. 3.

The lower-arm drivers 72 are configured to perform the driving function to drive the lower arm switches SWL. Each of lower-arm drivers 72 includes the lower-arm driver unit 80 and the first isolation transmitter 81. The lower-arm driver unit 80 is disposed in the high-voltage domain. The first isolation transmitter 81 is provided across the boundary between the low-voltage domain and the high-voltage domain, with portions thereof disposed in both the low-voltage domain and the high-voltage domain. The first isolation transmitter 81 electrically isolates the low-voltage domain from the high-voltage domain, and transmits a switching command for a corresponding one of the lower arm switches SWL between the microcomputer 51 and the lower-arm driver unit 80.

The first isolation transmitter 81 includes the photocoupler 81_a_, the additional resistor 81_b_, and the constant voltage power supply 81_c_. The constant voltage power supply 81_c_ is provided in the high-voltage domain within the lower-arm driver 72, and generates a constant voltage using the output voltage of the isolation power supply 70 as its power source. The switching command for the lower arm switch SWL is inputted from the microcomputer 51 into the low-voltage domain side of the photocoupler 81_a_. The high-voltage domain of the photocoupler 81_a_ is constituted by a phototransistor whose collector is connected to the constant voltage power supply 81_c_ through the additional resistor 81_b_. The phototransistor of the photocoupler 81_a_ has an emitter connected to the emitter of the lower arm switch SWL. The lower-arm driver unit 80 acquires the voltage appearing at the collector of the phototransistor of the photocoupler 81_a_ in the form of the switching command for the lower arm switch SWL. The lower-arm driver unit 80 then analyzes the acquired switching command to turn on or off the lower arm switch SWL. It should be noted that second to third isolation transmitters 82 to 84, which will be described later, have the same configuration as the first isolation transmitter 81.

Each of the lower-arm drivers 72 includes the gate-charging constant-voltage power supply 90, the charging switch 91, the charging resistor 92, the discharging switch 93, and the discharging resistor 94. The charging switch 91 is made of a P-channel MOSFET. The discharging switch 93 is made of an N-channel MOSFET. The following discussion will refer to only one of the low-arm drivers 72 or the upper-arm drivers 71 for the brevity of explanation.

The gate of the lower arm switches SWL is connected to the gate-charging constant-voltage power supply 90 through the charging switch 91 and the charging resistor 92. The emitter of the lower arm switches SWL is connected to the gate thereof through the discharging resistor 94 and the discharging switch 93. The gates of the charging switch 91 and the discharging switch 93 are connected to the lower-arm driver unit 80. The constant-voltage power supply 90 generates a constant voltage using the output voltage of the isolation power supply 70.

When the switching command for the lower arm switch SWL, as acquired by the lower-arm driver unit 80, is an ON command, the lower-arm driver unit 80 turns on the charging switch 91 and turns off the discharging switch 93. This causes the gate voltage at the lower arm switch SWL to become equal to or greater than a threshold voltage thereof, thereby switching the lower arm switch SWL to an on-state. Alternatively, when the switching command for the lower arm switch SWL, as acquired by the lower-arm driver unit 80, is an OFF command, the lower-arm driver unit 80 turns off the charging switch 91 and turns on the discharging switch 93. This causes the gate voltage at the lower arm switch SWL to become lower than the threshold voltage thereof, thereby switching the lower arm switch SWL to an off state.

The lower-arm driver 72 is configured to operate an off-hold function for the lower arm switch SWL. Specifically, the lower-arm driver 72 includes the lower-arm off-hold switch 95. The lower-arm off-hold switch 95 is made of an N-channel MOSFET. The drain of the lower-arm off-hold switch 95 is connected to the gate of the lower arm switch SWL. The source of the lower-arm off-hold switch 95 is connected to the emitter of the lower arm switch SWL. The gate of the lower-arm off-hold switch 95 is connected to the lower-arm driver unit 80.

The lower-arm driver unit 80 turns off the lower-arm off-hold switch 95 when the switching command for the lower arm switch SWL is an on command, while it turns on the lower-arm off-hold switch 95 when the switching command for the lower arm switch SWL is an off command. By turning on the lower-arm off-hold switch 95 during the off command for the lower arm switch SWL, the gate and emitter of the lower arm switch SWL are short-circuited. This minimizes a risk of occurrence of self turn-on of the lower arm switch SWL.

It is noted, as a supplementary explanation regarding the self turn-on of the upper and lower arm switches SWH and SWL, that electric charge may be supplied to the gates of the upper and lower arm switches SWH and SWL via parasitic capacitances thereof, whereby the gate voltages may become equal to or greater than the respective threshold voltages Vth. In such a case, even though the upper and lower arm switches SWH and SWL are intended to be maintained in the off state, a phenomenon known as self turn-on may occur, in which the switches SWH and SWL are erroneously turned on. Such self turn-on of the upper and lower arm switches SWH and SWL may also occur in the external charging control mode or the external power feeding control mode. In this regard, the occurrence of self turn-on is suppressed during external charging control or external power feeding control by turning on the off-hold switches installed in the upper and lower-arm drivers 71 and 72.

The control system 10 includes the temperature-measuring constant current source 100 and the temperature sensor 101. The constant current source 100 uses voltage outputted from the isolation power supply 70 as a power supply to generate a constant current. The temperature sensor 101 includes a temperature-sensitive diode which is connected at an anode thereof to the constant current source 100 and at a cathode thereof to the emitter of the lower arm switch SWL. The lower arm switch SWL, the lower arm diode DL, and the temperature sensor 101 are integrated as a semiconductor module. A correlation exists between the temperature of the lower arm switch SWL and the voltage drop across the temperature-sensitive diode in the temperature sensor 101.

The lower-arm driver unit 80 is configured to perform the temperature measuring function to measure the temperature of the lower arm switch SWL. Specifically, the lower-arm driver unit 80 includes the first comparator 102 and the carrier generator 103. A voltage appearing at the anode of the temperature-sensitive diode of the temperature sensor 101 is applied to a non-inverting input terminal of the first comparator 102. The carrier generator 103 works to produce a carrier signal which is applied to the inverting input terminal of the first comparator 102. The carrier signal is, for example, a triangular wave signal. The first comparator 102 works to compare a signal inputted to the non-inverting input terminal thereof with the carrier signal to modulate the pulse width of the input signal. This causes the first comparator 102 to output a signal in the form of a temperature signal Tp whose duty factor, i.e., a ratio of a high-level duration thereof to one cycle of the carrier signal varies as a function of the input signal at the non-inverting input terminal of the first comparator 102.

The lower-arm driver 72 include the second isolation transmitter 82. The second isolation transmitter 82 occupies across the boundary between the low-voltage domain and the high-voltage domain and are disposed both in the low-voltage domain and in the high-voltage domain. The second isolation transmitter 82 achieves transmission of the temperature signal Tp between the lower-arm driver unit 80 and the microcomputer 51, while electrically isolating between the low-voltage domain and the high-voltage domain.

The lower-arm driver 72 is configured to measure an electrical current flowing through the lower arm switch SWL. Specifically, the lower-arm driver 72 includes the constant current source 110 for malfunction detection, the detection capacitor 111, and the detection diode 112. The constant current source 110 uses voltage outputted from the isolation power supply 70 to generate a constant current. The constant current source 110 is connected to a first terminal of the detection capacitor 111. A second terminal of the detection capacitor 111 is connected to the emitter of the lower arm switch SWL.

The detection diode 112 is connected at an anode thereof to a first terminal of the detection capacitor 111 and at a cathode thereof to the collector of the lower arm switch SWL. In other words, the detection diode 112 is connected in the above way to orient the forward direction from the detection capacitor 111 toward the lower arm switch SWL.

The detection capacitor 111 is applied with a determination voltage Vjd, which is a voltage developed between the anode of the detection diode 112 and the emitter of the lower arm switch SWL. Here, assuming that the voltage between the collector and the emitter of the lower arm switch SWL is Vce, and the forward voltage of the detection diode 112 is Vf, the determination voltage Vid is expressed as:

$$Vjd = Vce + Vf$$

A current detection using the above-described determination voltage Vjd is generally referred to as a desaturation detection.

The lower-arm driver unit 80 is configured to perform the abnormality detection function for the lower arm switch SWL. Specifically, the lower-arm driver unit 80 includes the second comparator 113 and the constant voltage source 114 for abnormality detection. The detection capacitor 111 is connected at a first terminal thereof to the non-inverting input terminal of the second comparator 113. The second comparator 113 is connected at an inverting input terminal thereof to the positive terminal of the constant voltage source 114. The constant voltage source 114 is connected at a negative terminal thereof to the emitter of the lower arm switch SWL.

The constant voltage source 114 applies to an inverting input terminal of the second comparator 113 a voltage that is higher in level than an emitter voltage developed at the lower arm switch SWL by a predetermined voltage level. The predetermined voltage level is set higher than the sum of a collector-emitter voltage Vce at the lower arm switch SWL when no overcurrent is present, and the forward voltage Vf at the detection diode 112. When the determination voltage Vjd is lower than the predetermined voltage level, the second comparator 113 determines that no overcurrent is present in the lower arm switch SWL and then outputs a Low-level abnormality signal FL. Alternatively, when the determination voltage Vid is equal to or higher than the predetermined voltage level, the second comparator 113 determines that an overcurrent has occurred in the lower arm switch SWL, and outputs a High-level abnormality signal FL.

The lower-arm driver 72 includes the third isolation transmitter 83. The third isolation transmitter 83 occupies across the boundary between the low-voltage domain and the high-voltage domain, that is, is disposed both in the low-voltage domain and in the high-voltage domain. The third isolation transmitter 83 achieves transmission of the abnormality signal FL between the lower-arm driver unit 80 and the microcomputer 51, while keeping electric isolation between the low-voltage domain and the high-voltage domain.

The lower-arm driver 72 is configured to perform the protection function for the upper and lower arm switches SWH and SWL. Specifically, the lower-arm driver 72 includes the soft turn-off switch 96 and the soft turn-off resistor 97. The soft turn-off switch 96 is made of an N-channel MOSFET. The emitter and the gate of the lower arm switch SWL are connected together through the soft turn-off resistor 97 and the soft turn-off switch 96. The soft turn-off resistor 97 has a resistance value higher than that of the discharging resistor 94.

When the abnormality signal FL is at a High level, the lower-arm driver unit 80 turns off the charging switch 91, the discharging switch 93, and the off-hold switch 95, and turns on the soft turn-off switch 96. This causes the lower arm switch SWL to be turned off while suppressing surge voltage arising from the turning off of the lower arm switch SWL, thereby protecting the upper and lower arm switches SWH and SWL.

The configuration of each of upper-arm drivers 71 is basically the same as that of each of lower-arm drivers 72. Accordingly, each of the upper-arm driver 71 has, similarly to the lower-arm drivers 72, a driving function for driving a corresponding one of the upper arm switches SWH, an off-hold function for maintaining a corresponding one of the upper arm switches SWH in an off state, the temperature measuring function to measure the temperature of a corresponding one of the upper arm switches SWH, an abnormality detection function for detecting an overcurrent abnormality of a corresponding one of the upper arm switches SWH, and a protection function for the upper and lower arm switches SWH and SWL.

The controller 50 is designed to use load currents delivered from power sources: the first to third power supplies 61 to 63 and the isolation power supply 70 to perform various control functions in the rotating electrical machine 20. Specifically, the load currents are supplied from the first power supply 61 to the excitation amplifier 52, and from the second power supply 62 to the angle interface circuit 53, thereby activating an angle detection function of the controller 50. The load current is supplied from the second power supply 62 to the current interface circuit 54, thereby activating a phase current detection function of the controller 50. The load current is supplied from the third power supply 63 to the microcomputer 51, thereby activating a command generation function of the microcomputer 51. The load currents are delivered from the isolation power supply 70 to the upper-arm drivers 71 and the lower-arm drivers 72, thereby activating the driving functions, the off-hold functions, the temperature measuring function, the abnormality detection functions, and the protection functions for the upper and lower arm drivers 71 and 72.

It is of concern that, during the course of external charging control mode or the external power feeding control mode, noise may be produced as a result of load currents flowing through the switching power supplies (i.e., the power supplies 61, 62*a*, 63*a*, and 70).

In this regard, during a situation in which the external charging control or the external power feeding control is being performed, it may become unnecessary to continue one or some of the various control functions provided by the controller 50. The controller 50 is, therefore, designed to deactivate or restrict at least one of or at least a portion of one or some of the control functions it provides. The configuration for executing this restriction task will be described below.

The controller 50 includes the first to fifth cutoff switches 121 to 125. The first and second cutoff switches 121 and 122 are operated by the microcomputer 51. The third to fifth cutoff switches 123 to 125 are operated by the upper and lower arm drivers 71 and 72. The first to fifth cutoff switches 121 to 125 are disposed in electrical paths through which load currents from the respective power supplies 61 to 63 and 70 flow. Specifically, the first cutoff switch 121 is arranged in the first electrical path L1, while the second cutoff switch 122 is arranged in the second electrical path L2.

The third and fourth cutoff switches 123 and 124 are provided for the upper-arm driver 71 and the lower-arm driver 72, respectively. For example, referring to the lower-arm driver 72 as shown in FIG. 3, the third cutoff switch 123 is disposed in the third electrical path L3 through which current is supplied from the constant voltage power supply 81*c* of the first isolation transmitter 81 to the photocoupler 81*a*. The fourth cutoff switch 124 is disposed in the fourth electrical path L4 through which current is delivered from the constant current source 110, which is used for abnormality detection, to the detection capacitor 111.

The fifth cutoff switch 125 is provided for each of the temperature sensors 101 of the upper and lower arm switches SWH and SWL. Taking one of the lower arm switches SWL as an example, as shown in FIG. 3, the fifth cutoff switch 125 is arranged in the fifth electrical path L5 through which current is delivered from the temperature-measuring constant current source 100 to the temperature sensor 101.

Each of the first to fifth cutoff switches 121 to 125 is made of a relay or a semiconductor switching device. When turned on, each of the first to fifth cutoff switches 121 to 125 allows current to flow in either direction, while when turned off, it block the flow of current in either direction.

The microcomputer 51 transmits the vehicle-state signal Sga, which is acquired from the upper-level ECU 42, to the upper-arm driver 71 and the lower-arm driver 72. Taking the lower-arm driver 72 as an example, as shown in FIG. 3, the lower-arm driver 72 includes the fourth isolation transmitter 84. The fourth isolation transmitter 84 is arranged across the boundary between the low-voltage domain and the high-voltage domain and disposed both in the low-voltage domain and the high-voltage domain. The fourth isolation transmitter 84 works to electrically isolate between the low-voltage domain and the high-voltage domain and achieve transmission of the vehicle-state signal Sga between the microcomputer 51 and the lower-arm driver unit 80. The lower-arm driver unit 80 receives, as the vehicle-state signal Sga, the output signal from the fourth isolation transmitter 84. The lower-arm drive unit 80 analyzes the received vehicle-state signal Sga to determine whether the vehicle is in the normal state or in the external charging state.

When the microcomputer 51 determines that the vehicle-state signal Sga is at the high level, it executes the restriction task to limit the control functions of the controller 50 described above. Specifically, the microcomputer 51 limits or deactivates: the command generation function for each of the switches SWH and SWL; the angle detection function of the excitation amplifier 52 and the angle interface circuit 53; the phase current detection function of the current interface circuit 54; and all functions of the upper-arm driver 71 and the lower-arm driver 72 except for the off-hold function.

More specifically, when the microcomputer 51 receives the high-level vehicle-state signal Sga, it executes the following restriction tasks. That is, the microcomputer 51 performs:

- a task of stopping the generation of the switching commands for each of the switches SWH and SWL;
- a task of stopping the generation of the excitation signal;
- a task of turning off the first cutoff switch 121 installed in the first electrical path L1;
- a task of turning off the second cutoff switch 122 provided in the second electrical path L2; and
- a task of transmitting the high-level vehicle-state signal Sga, received from the upper-level ECU 42, to the upper-arm driver 71 and the lower-arm driver 72.

The execution of the restriction tasks in the above way will stop the generation of the switching commands for the switches SWH and SWL, the command generation function for the switches SWH and SWL, and the generation of the excitation signals. This causes the current consumption of the microcomputer 51 to be reduced and the load current supplied from the third power supply 63 to the microcomputer 51 to be decreased. The microcomputer 51 may continue to execute other processes or tasks, such as acquiring the vehicle-state signal Sga. In such a case, the control functions of the microcomputer 51 are restricted.

When the generation of the excitation signal in the microcomputer 51 is stopped, it causes the excitation amplifier 52 to cease its operation of amplifying the excitation signal. The amplification operation of the excitation amplifier 52 is also halted when the first cutoff switch 121 is turned off. When the second cutoff switch 122 is turned off, it stops the operation of the angle interface circuit 53, thereby disabling the angle detection function. This causes the load current supplied from the first power supply 61 to the excitation amplifier 52 to be reduced and the load current supplied from the second power supply 62 to the angle interface circuit 53 to be also reduced.

When the second cutoff switch 122, which is installed in the second electrical path L2, is turned off, it stops the operation of the current interface circuit 54. This causes the phase current detection function to be disabled. The load current supplied from the second power supply 62 to the current interface circuit 54 is, therefore, stopped.

When each of the upper-arm driver 71 and the lower-arm driver 72 receives the high-level vehicle-state signal Sga from the microcomputer 51, it stops the drive function, temperature measuring function, abnormality detection function, and protection function thereof, while continuing off-hold function thereof. The load current supplied from the isolation power supply 70 is, therefore, reduced. Hereinafter, a detailed explanation will be provided using the lower-arm driver 72 as an example.

When the lower-arm driver 72 receives the high-level vehicle-state signal Sga from the microcomputer 51, it turns on the off-hold switch 95, and turn off the charging switch 91, the discharging switch 93, and the soft turn-off switch 96. The lower-arm driver 72 also turns off the third cutoff switch 123, thereby stopping the supply of current from the constant voltage power supply 81*c* of the first isolation transmitter 81 to the photocoupler 81*a*. This causes the drive function for the lower arm switch SWL to be stopped without deactivating the off-hold function for the lower arm switch SWL.

When the lower-arm driver 72 receives the high-level vehicle-state signal Sga from the microcomputer 51, it stops the operation of the second comparator 113 and halts the generation of a predetermined voltage by the constant voltage source 114 for abnormality detection. The lower-arm driver 72 also turns off the fourth cutoff switch 124, thereby disabling the abnormality detection function and the protection function.

The lower-arm driver 72 stops the operation of the first comparator 102 and suspends the generation of a carrier signal by the carrier generator 103 when the vehicle-state signal Sga at the high level is received from the microcomputer 51. Furthermore, the lower-arm driver 72 turns off the fifth cutoff switch 125, thereby deactivating the temperature 15 measuring function.

Figure 4:
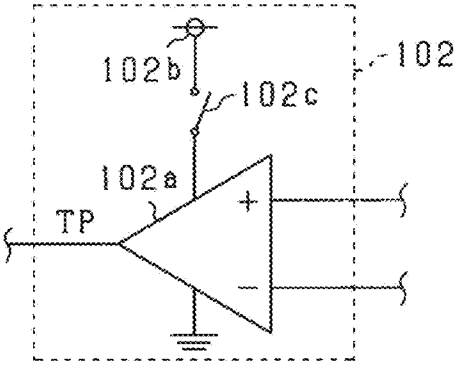
FIG. 4 is a diagram illustrating an example of a process for stopping an operation of a microcontroller.

FIG. 4 illustrates a configuration for stopping operation of the first comparator 102. The first comparator 102 includes the internal circuit 102*a*, the constant voltage power supply 102*b*, and the stop switch 102*c*. The internal circuit 102*a* is connected at a positive terminal thereof to the constant voltage power supply 102*b* through the stop switch 102*c* and at a negative terminal thereof to an emitter of the lower arm switch SWL. The constant voltage power supply 102*b* uses the isolation power supply 70 as a power source thereof and generates a constant voltage using an output voltage from the isolation power supply 70. The internal circuit 102*a* works to compare between an input signal to a non-inverting input terminal thereof and an input signal to an inverting input terminal thereof to produce the temperature signal Tp upon receiving a voltage supply from the constant voltage power supply 102*b*. The stop switch 102*c* is, for example, a semiconductor switching device, and allows bidirectional current flow when turned on, and blocks bidirectional current flow when turned off. The lower-arm driver 72 turns off the stop switch 102*c* when the vehicle-state signal Sga at the high level is received from the microcomputer 51. This stops or deactivates the operation of the first comparator 102. The second comparator 113 may be designed to have the same structure as that of the first comparator 102 in order to deactivate the second comparator 113.

Figure 5:
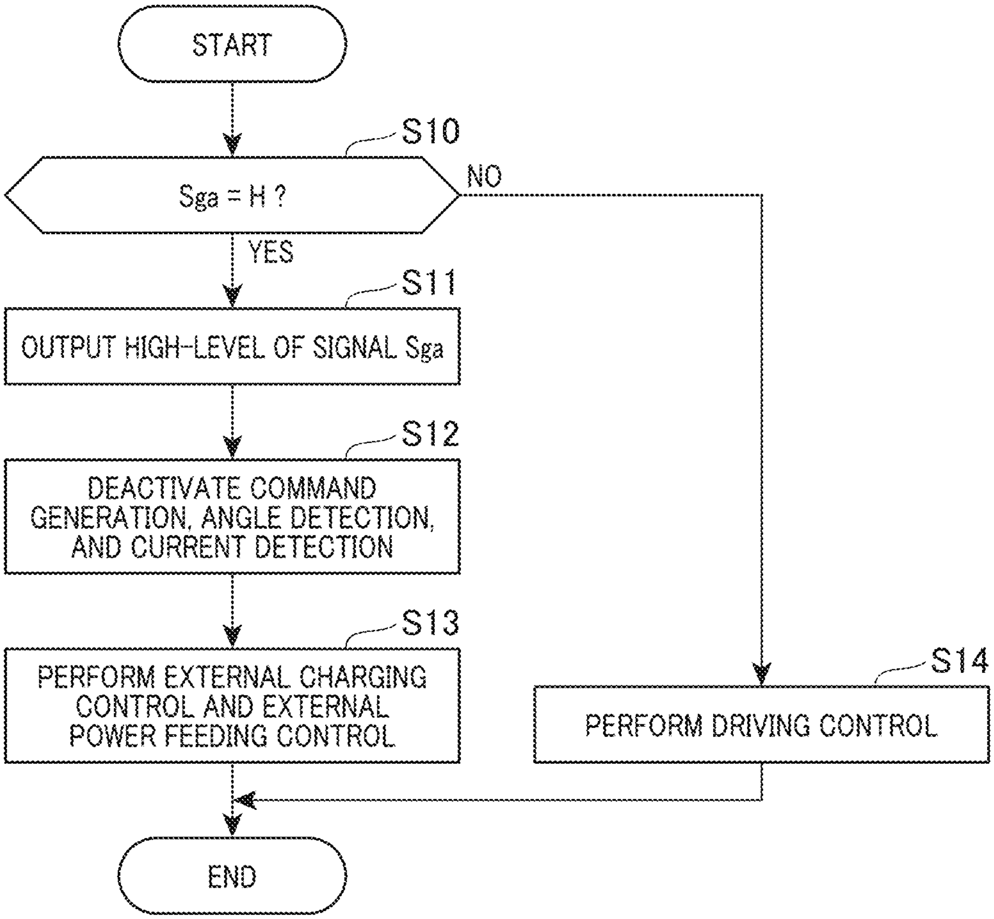
FIG. 5 is a flowchart of a sequence of steps or a control procedure executed by a microcontroller.

FIG. 5 is a flowchart of a sequence of steps or control program executed by the microcomputer 51. This program is executed cyclically.

After entering the program, the routine proceeds to step S10 wherein it is determined whether the vehicle-state signal Sga, as inputted from the upper-level ECU 42, is at the high-level. If a YES answer is obtained in step S10, then the routine proceeds to step S11. Alternatively, if a NO answer is obtained, then the routine proceeds to step S13.

In step S11, the high level of the vehicle-state signal Sga is transmitted to the upper- and lower-arm drivers 71 and 72 in restriction task. This causes, as described above, the upper- and lower-arm drivers 71 and 72 to deactivate all the functions thereof except the off-hold function.

In step S12, the command generation function, the angle detection function, and the current detection function are stopped in the restriction task. Specifically, the generation of switching commands for the upper-arm and lower-arm switches SWH and SWL is stopped, and generation of excitation signal is also stopped. In addition, the first and second cutoff switches 121 and 122 are turned off. In step S13, the external charging control task or the external power feeding control task is executed. In this case, the power supply switch SMR is maintained in the on-state. It should be noted that the operations of steps S11 and S12 constitute the "restriction unit."

In step S14, the drive control task for the rotating electrical machine 20 is executed. In this case, no restriction is imposed on the various control functions of the controller 50.

The above-described embodiment offers the following beneficial advantages.

When the vehicle-state signal Sga is determined to be at the high level, the control functions for the rotating electrical machine 20 possessed by the controller 50 are restricted. This results in a decrease in amount of load current supplied from the power supplies 61, 62, and 70 to the excitation amplifier 52, the angle interface circuit 53, the current interface circuit 54, and the upper- and lower-arm drivers 71 and 72. This leads to a decrease in amount of electrical power generated by the power supplies 61, 62, and 70 and also minimizes noise arising from the switching control of switching power supplies (i.e., the power supplies 61, 62, and 70). Moreover, the current flowing to portions of the controller 50 other than the switching power supplies is reduced with the reduction in the load current, thereby suppressing generation of magnetic flux that serves as a source of noise. The noise generated due to the flow of load current through the power supplies 61, 62, and 70 is, therefore, reduced.

The rotating electrical machine 20 is stopped during the external charging control mode or the external power feeding control mode, thereby eliminating the need to continue the angle detection function for detecting or determining the electrical angle of the rotating electrical machine 20. Specifically, when the vehicle-state signal Sga is determined to be at the high level, the angle detection function is deactivated, thereby resulting in a reduction in load current supplied from the first power supply 61 to the excitation amplifier 52, which leads to a decrease in noise generated due to the load current.

When the vehicle-state signal Sga is determined to be at the high level, the control functions of the upper- and lower-arm drivers 71 and 72 other than the off-hold function are deactivated. Maintaining the off-hold function eliminates a risk that the upper- and lower-arm switches SWH and SWL may be unintentionally turned on during the external charging control mode or the external power feeding control mode. Additionally, the functions of the upper- and lower-arm drivers 71 and 72 other than the off-hold function which include: the drive function for driving the upper- and lower-arm switches SWH and SWL; the temperature measuring function for measuring the temperature of the upper- and lower-arm switches SWH and SWL; the abnormality detection function for detecting overcurrent abnormalities in the upper- and lower-arm switches SWH and SWL; and the protection function for protecting the upper- and lower-arm switches SWH and SWL when the overcurrent abnormality occurs, are deactivated. This results in a reduction in amount of load current supplied from the isolation power supply 70 to the upper- and lower-arm drivers 71 and 72, thereby minimizing noise generated due to load current from the isolation power supply 70 while also preventing unintended turning-on of the upper- and lower-arm switches SWH and SWL during the 20) external charging control mode or the external power feeding control mode.

When the vehicle-state signal Sga is determined to be at the high level, the first to fifth cutoff switches 121 to 125 are turned off. This blocks a flow of current through the power supply paths to the excitation amplifier 52, the angle interface circuit 53, the current interface circuit 54, and the upper and lower arm drivers 71 and 72, thereby sufficiently reducing the amount of load current supplied from the power supplies 61, 62, and 70 to the excitation amplifier 52, the angle interface circuit 53, the current interface circuit 54, and the upper and lower arm drivers 71 and 72.

Modification of First Embodiment

The external charging or the power supply may be performed while the neutral point of the three-phase armature windings 21 is electrically connected to the inlet 13 through the relay 14. In this case, the microcomputer 51 controls the switching operations of the upper-arm and lower-arm switches SWH and SWL. Such switching control is, for example, performed to step-up the output voltage from the external power supply 210 and supply it to the high-voltage battery 11, or to step down the voltage of the smoothing capacitor 32 and supply power to an external load. In other words, the microcomputer 51 is configured to be capable of performing a voltage conversion function that generates the switching commands to step-up the voltage of the charging power inputted from the external power supply 210 through the neutral point during the external charging control (i.e., in the external charging control mode), or to step-down the voltage of electrical power supplied to the external load through the neutral point during the external power feeding control (i.e., in the external power feeding control mode). Therefore, the microcomputer 51 works to continue only the control function necessary for executing the switching control for the upper-arm and lower-arm switches SWH and SWL during the external charging control or the external power feeding control, while restricting other control functions. Specifically, the microcomputer 51 does not perform the operation in step S11 in FIG. 5, but executes only the operation in step S12 for stopping the angle detection function. In this case, the phase current detection function, the voltage conversion function, and various control functions of the upper and lower arm drivers 71 and 72 are maintained.

In the above modification, when the vehicle-state signal Sga is at the high level, the phase current detection function, the voltage conversion function of the microcomputer 51, and various control functions of the upper and lower arm drivers 71 and 72 are maintained. This enables the switching control for converting the input/output voltage of the inverter 30 to be achieved. On the other hand, the angle detection function is stopped, thereby resulting in a decrease in amount of load current produced by the first and second power supplies 61 and 62. This leads to a reduction in noise generated due to load current while the switching control for converting the input/output voltage of the inverter 30 is being executed during the external charging control or the external power feeding control.

The microcomputer 51 may be designed not to generate the excitation signal inputted to the excitation amplifier 52. An additional signal generator for generating the excitation signal may be provided separately from the microcomputer 51. In this case, in step S12 of FIG. 5 described above, the microcomputer 51 may stop the operation of the signal generation circuit to thereby stop the angle detection function.

Second Embodiment

The second embodiment will be described with reference to the drawings, focusing primarily on the differences from the first embodiment.

In the external charging control mode or the external power feeding control mode, the rotating electrical machine 20 is kept stopped. This eliminates the need to continue the operation of the microcomputer 51. Accordingly, the second embodiment is configured to deactivate the microcomputer 51 in the restriction task when the vehicle-state signal Sga is at the high level. Specifically, the microcomputer 51 is reset to deactivate the operation thereof when the vehicle-state signal Sga is at the high level. The reset of the microcomputer 51 is achieved by setting the voltage level of a reset terminal of the microcomputer 51 to a Low level.

Figure 6:
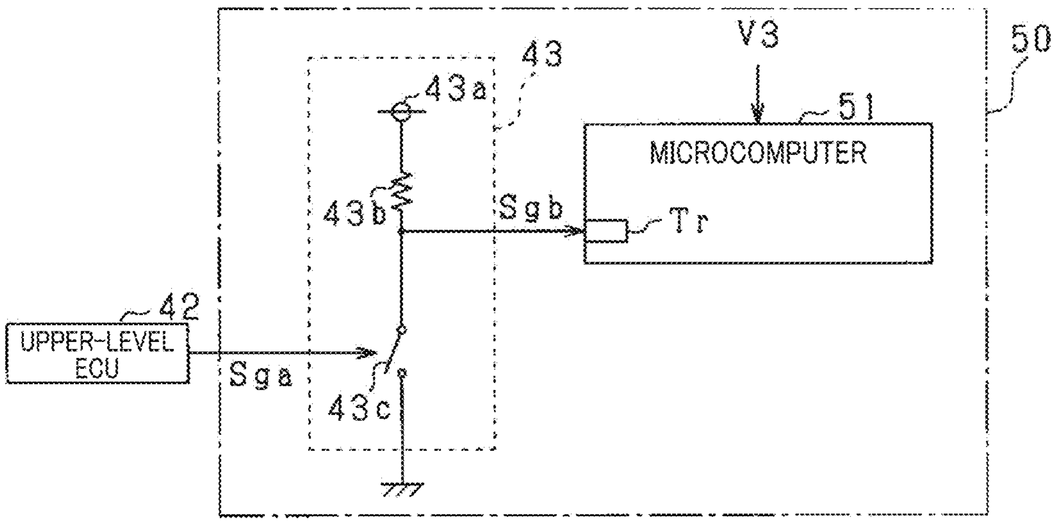
FIG. 6 is a configuration diagram of a control apparatus according to the second embodiment.

FIG. 6 illustrates an example of a configuration for resetting the microcomputer 51. The controller 50 includes the reset circuit 43 serving as a restriction unit. The reset circuit 43 works to output the reset signal Sgb to the reset terminal Tr of the microcomputer 51. The reset signal Sgb is a signal that instructs the microcomputer 51 to be reset when it is at a low level, and instructs the cancellation of the reset when it is at a high level. In FIG. 6, the same reference numerals are used for components identical to those shown in FIG. 2 for convenience.

The reset circuit 43 includes the constant voltage power supply 43*a* for resetting the microcomputer 51, the reset resistor 43*b*, and the reset switch 43*c*. The constant voltage power supply 43*a* is connected to a first end of the reset resistor 43*b*. The reset resistor 43*b* is connected at a second end thereof to a high-potential-side terminal of the reset switch 43*c*. The reset switch 43*c* has a low-potential-side terminal connected to ground. The reset switch 43*c* is, for example, a semiconductor switching element, and is turned on when the vehicle-state signal Sga from the upper-level ECU 42 is at the high level, and is turned off when the vehicle-state signal Sga is at the low level. A voltage appearing between the reset resistor 43*b* and the reset switch 43*c* is input in the form of the reset signal Sgb to the reset terminal Tr of the microcomputer 51. When the low-level reset signal Sgb is input to the reset terminal Tr of the microcomputer 51, the microcomputer 51 is reset. Alternatively, when the high-level reset signal Sgb is input to the reset terminal Tr of the microcomputer 51, the reset of the microcomputer 51 is released. The vehicle-state signal Sga from the upper-level ECU 42 may alternatively be inputted directly to the reset terminal Tr of the microcomputer 51, whereby the microcomputer 51 is reset in accordance with the voltage level of the vehicle-state signal Sga.

As apparent from the above discussion, in the second embodiment, when it is determined that the vehicle-state signal Sga is at the high level, the microcomputer 51 is reset, so that it is deactivated. This results in a decrease in amount of load current supplied from the third power supply 63 to the microcomputer 51 and also minimizes noise generated due to the flow of the load current.

Third Embodiment

Figure 7:
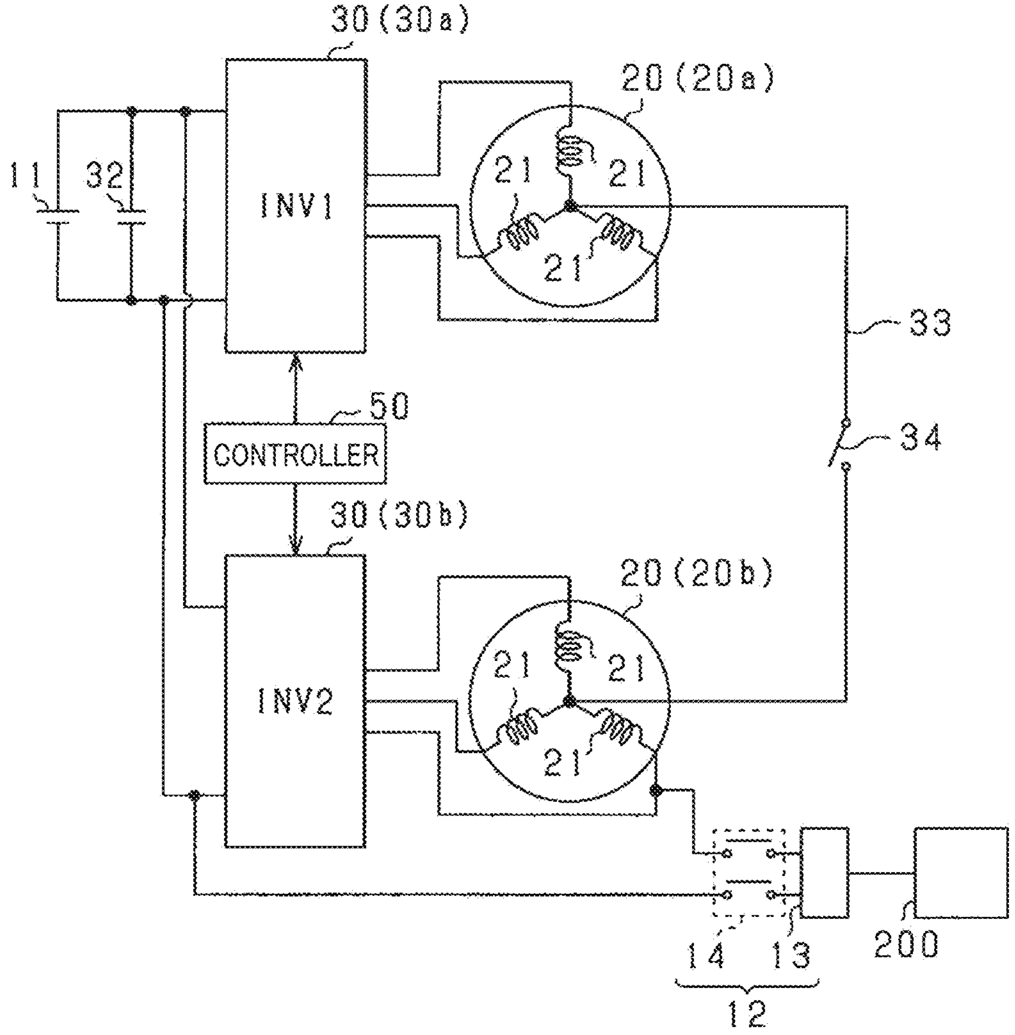
FIG. 7 is an overall configuration diagram of a control system according to the third embodiment.

The controller 50 is not limited to application in a single-motor control system, but may also be applied to a dual-motor control system. Specifically, as shown in FIG. 7, the dual-motor control system includes a first set of the first rotating electrical machine 20*a* and the first inverter 30*a*, and a second set of the second rotating electrical machine 20*b* and the second inverter 30*b*. A rotor of the first rotating electrical machine 20*a* and a rotor of the second rotating electrical machine 20*b* are connected to drive wheels of the vehicle and to a crankshaft of an engine serving as a primary power source through a power split mechanism mounted in the vehicle. The first rotating electrical machine 20*a* is connected to the first inverter 30*a* and serves as, for example, a starter that imparts initial rotation to the engine crankshaft, or as an electrical generator that supplies electrical power to in-vehicle electrical devices. The second rotating electrical machine 20*b* is connected to the second inverter 30*b* and functions as a primary power source for the vehicle. It should be noted that, in FIG. 7, the same reference numerals as those in FIG. 1 refer to the same parts for convenience.

The relay 14 of the external charging mechanism 12 is connected between an outer end of one of the armature windings 21 of the second rotating electrical machine 20*b* which is connected to the second inverter 30*b* and a negative bus of the second inverter 30*b*. The neutral point of the armature windings 21 of the first rotating electrical machine 20*a* is connected to the neutral point of the armature windings 21 of the second rotating electrical machine 20*b* through connection line 33. The connection line 33 has the connection switch 34 disposed therein. The connection switch 34 is made of a relay or a semiconductor switching device. When turned on, the connection switch 34 allows bidirectional current flow, while when turned off, the connection switch 34 blocks bidirectional current flow. The connection switch 34 is operated, for example, by the controller 50 or by the upper-level ECU 42.

Figure 8:
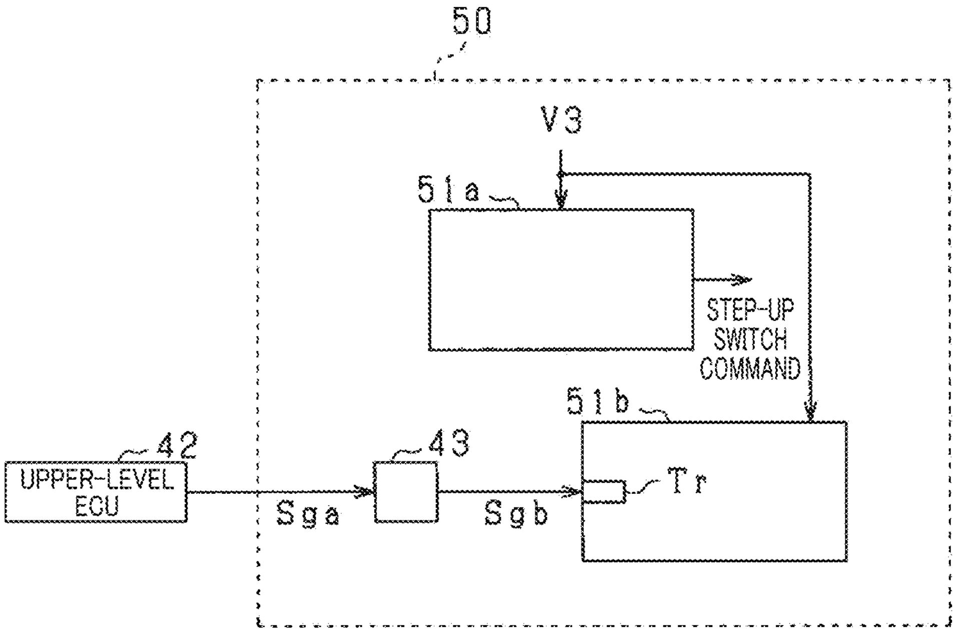
FIG. 8 is a diagram which illustrates a control apparatus and its peripheral configuration.

The controller 50, as illustrated in FIG. 8, includes the first microcomputer 51*a* that generates switching commands for the upper- and lower-arm switches SWH and SWL installed in the first inverter 30*a*, and the second microcomputer 51*b* that generates switching commands for the upper- and lower-arm switches SWH and SWL installed in the second inverter 30*b*. In FIG. 8, the same reference numerals as those in FIG. 2 refer to the same parts for the sake of convenience.

In the external charging control mode, the first rotating electrical machine 20*a* and the first inverter 30*a* are used as a step-up circuit that steps-up an output voltage developed by the external power supply 210. The first microcomputer 51*a* generates the switching command for the first inverter 30*a* to step-up the output voltage of the external power supply 210 and supply it to the high-voltage battery 11. In the external power feeding control mode, the first rotating electrical machine 20*a* and the first inverter 30*a* may be used as a step-down circuit that steps down the voltage of the smoothing capacitor 32 and supplies power to an external power receiving device. When the first microcomputer 51*a* generates switching commands for performing step-up control or step-down control in the external charging control mode or the external power feeding control mode, the voltage conversion function of the first microcomputer 51*a* is maintained.

The reset signal Sgb from the reset circuit 43 is inputted to the reset terminal Tr of the second microcomputer 51*b*. When the reset signal Sgb is at the low level, it resets the second microcomputer 51*b*, thereby deactivating the operation of the second microcomputer 51*b*. The reset signal Sgb is not inputted to the first microcomputer 51*a*, thereby maintaining the voltage conversion function of the first microcomputer 51*a*.

As apparent from the above discussion, in the dual-motor control system in the third embodiment, when the vehicle-state signal Sga is at the high level, the operation of the second microcomputer 51*b* is stopped, thereby resulting in a decrease in required amount of load current supplied from the third power supply 63 to the second microcomputer 51*b*. As compared to in the drive control mode in which the first and second rotating electrical machines 20*a* and 20*b* are both operated, the required amount of load current supplied from the third power supply 63 to the first and second microcomputers 51*a* and 51*b* is also reduced. The voltage conversion function of the first microcomputer 51*a* is maintained, thereby enabling switching control to be achieved for converting an input or output voltage to or from the first inverter 30*a* when the vehicle-state signal Sga is at the high level. It, therefore, becomes possible to continue the switching control for converting the input or output voltage to or from the first inverter 30*a* in the external charging control mode or the external power feeding control mode, while reducing noise arising from the flow of load current.

OTHER EMBODIMENTS

Each of the above-described embodiments may be modified in the following ways.

It is sufficient that any one of the operations or processes described in the first embodiment, the second embodiment, or the third embodiment may be executed during execution of the external charging control task or the external power supply control task. Specifically, it is sufficient that any one of the following processes is executed by the microcomputer 51 or the reset circuit 43:

- a process of stopping the generation of the switching command for each of the switches SWH and SWL;
- a process of stopping the generation of the excitation signal;
- a process of turning off the first cutoff switch 121 installed in the first electrical path L1;
- a process of turning off the second cutoff switch 122 installed in the second electrical path L2;
- a process of transmitting the high-level vehicle-state signal Sga, which is acquired from the upper-level ECU 42, to the upper and lower arm drivers 71 and 72;
- a process of resetting the microcomputer 51.

The control apparatus may be designed to define, as a specific function, one of the angle detection function, the phase current detection function, the command generation function, and the control functions of the upper and lower arm drivers 71 and 72 in which the switching power supply 61, 62, 63, or 70 outputs the largest load current, and to execute the given operations during execution of the external charging control task or the external power feeding control task in order to reduce the consumption of electrical current in the specific function.

For example, when the specific function is the command generation function of the microcomputer 51 is selected as the specific function, the operation executed in the external charging control mode or the external power feeding control mode may include a process in which the generation of switching commands by the microcomputer 51 is stopped, or a process in which the operation of the microcomputer 51 is stopped by the reset circuit 43. This results in a reduction in amount of electrical current consumed by the microcomputer 51 to perform the command generation function. It should be noted that, in consideration of the magnitude of the load current supplied from the switching power supply due to the continuation of each function, the angle detection function or the various control functions of the upper and lower arm drivers 71 and 72 may alternatively be included in the specific function.

In the above structure, when it is determined that the vehicle-state signal Sga is at the high level, the current consumption of the command generation function of the microcomputer 51 will be reduced. In this case, the third power supply 63 reduces the duty factor of the switch Q, which is set when controlling the output voltage to the third voltage V3 in the feedback mode. This results in a decrease in amount of the load current from the third power supply 63. Since the command generation function of the microcomputer 51 is, as described above, one of the control functions in which the largest load current is supplied from the switching power supply, the reduction in the current consumption in the command generation function enables an appropriate reduction in the load current supplied from the third power supply 63 to the microcomputer 51.

When the external charging control mode or the external power supply control mode is entered, at least two of the above-described processes or functions may be executed.

The upper and lower arm drivers 71 and 72, upon acquiring the vehicle-state signal Sga at the high level, may stop one, two, or three of the drive function, the temperature measuring function, the abnormality detection function, and the protection function, instead of stopping all of these functions.

Instead of employing a desaturation detection method to detect or measure the current flowing through each of the upper and lower arm switches SWH and SWL, it is also possible to detect a sense current that flows in proportion to the current flowing between the collector and the emitter of each of the upper and lower arm switches SWH and SWL.

The low-voltage battery 60 and the high-voltage battery 11 are not limited to storage batteries, and may be, for example, capacitors such as electric double-layer capacitors.

The mobile body on which the control apparatus is mounted is not limited to a vehicle, and may be, for example, an aircraft or a ship.

The controllers, how to construct them, or tasks (i.e., functions) performed thereby, as referred to in this disclosure, may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The controllers or operations thereof referred to in this disclosure may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium.

The above-described embodiments offer the following unique structures

First Structure

A control apparatus (50) for use in a system which includes an energy storage device (11), an inverter (30) connected to the energy storage device, and a rotating electrical machine (20) equipped with armature windings (21) connected to the inverter. The control apparatus comprises a switching power supply (61, 62, 63, 70) which is equipped with a switch (Q, 70*b*) and works to control a switching operation of the switch to output a load current; and a restriction unit. The control apparatus uses, as a power source, the load current delivered from the switching power supply to perform a plurality of control functions to control an operation of the rotating electrical machine. The restriction unit works to perform a restriction task to restrict at least one of the control functions in response to a determination that an external charging control mode is entered which electrically charges the energy storage device using an external power supply (210) located outside the system or that an external power feeding control mode is entered which feeds electrical energy from the energy storage device to an external power receiving target located outside the system.

Second Structure

The control apparatus as set forth in the above first structure, wherein one of the control functions in which a largest load current is delivered from the switching power supply is defined as a specific function, and the restriction unit performs, as the restriction task, a process to decrease an amount of electrical current consumed in the specific function in response to a determination that a condition where the external charging control mode is entered or where the external power feeding control mode is entered is met.

Third Structure

The control apparatus as set forth in the above first or second structure, wherein the control functions include an angle detection function to detect an electrical angle of the rotating electrical machine. The restriction unit performs, as the restriction task, a process to deactivate the angle detection function in response to the determination that the condition where the external charging control mode is entered or where the external power feeding control mode is entered is met.

Fourth Structure

The control apparatus as set forth in the above third structure, further comprising an excitation signal generator (52) which is supplied with the load current from the switching power supply to produce an alternating current excitation signal. The system includes an angle sensor (40) which modulate the excitation signal as a function of an electrical angle of the rotating electrical machine and output the modulated excitation signal in a form of an angle signal. The angle detection function is to determine an electrical angle of the rotating electrical machine as a function of the angle signal produced by the angle sensor. The restriction unit performs, as the process to deactivate the angle detection function, a process to stop the excitation signal generator from producing the excitation signal.

Fifth Structure

The control apparatus as set forth in any one of the above first to fourth structure, further comprising a microcomputer (51) which works to produce switching commands for upper- and lower-arm switches (SWH, SWL) installed in the inverter. The microcomputer has, as one of the control functions, a command generation function to produce the switching commands to drive the rotating electrical machine. The restriction unit performs, as the restriction task, a process to deactivate the command generation function of the microcomputer in response to the determination that the condition where the external charging control mode is entered or where the external power feeding control mode is entered is met.

Sixth Structure

The control apparatus as set forth in any one of the above first to fifth structure, further comprising a driver (71, 72) which works to drive an upper-arm switch (SWH) and a lower-arm switch (SWL) installed in the inverter. The driver is designed to have, as the control functions, a drive function which turns on or off the upper- and lower-arm switches and an off-hold function which keeps the upper-arm and lower-arm switches off. The restriction unit performs, as the restriction task, a process to deactivate the control functions of the driver other than the off-hold function in response to the determination that the condition where the external charging control mode is entered or where the external power feeding control mode is entered is met.

Seventh Structure

The control apparatus as set forth in any one of the above first to sixth structures, further comprising an electrical path (L1 to L5) through which the load current delivered from the switching power supply flows and a cutoff switch (121 to 125) disposed in the electrical path. The restriction unit, as the restriction task, turns off the cutoff switch in response to the determination that the condition where the external charging control mode is entered or where the external power feeding control mode is entered is met.

Eighth Structure

The control apparatus as set forth in any one of the above first to seventh structures, wherein the system includes an external charging mechanism (12) and a microcomputer (51). The external charging mechanism works to connect the external power supply or the external power receiving target to a neutral point of the armature windings. The microcomputer works to produce switching commands for an upper-arm switch (SWH) and a lower-arm switch (SWL) installed in the inverter. The microcomputer has, as the control functions, a drive function which produces the switching commands to drive the rotating electrical machine and a voltage conversion function that generates the switching commands to step-up voltage of a charging power inputted from the external power supply through the neutral point in the external charging control mode or step-down voltage of electrical power supplied to the external power receiving target through the neutral point in the external power feeding control mode. The restriction unit performs, as the restriction task, a process to deactivate the drive function while maintaining the voltage conversion function in response to the determination that the condition where the external charging control mode is entered or where the external power feeding control mode is entered is met.

This disclosure is not limited to the above embodiments, but may be realized by various embodiments without departing from the purpose of the disclosure. This disclosure includes all possible combinations of the features of the above embodiments or features similar to the parts of the above embodiments. The structures in this disclosure may include only one or some of the features discussed in the above embodiments unless otherwise inconsistent with the aspects of this disclosure.

What is claimed is:

1. A control apparatus for use in a system which includes an energy storage device, an inverter connected to the energy storage device, and a rotating electrical machine equipped with armature windings connected to the inverter, the control apparatus comprising:

a switching power supply which is equipped with a switch and works to control a switching operation of the switch to output a load current; and a restriction unit, wherein the control apparatus uses, as a power source, the load current delivered from the switching power supply to perform a plurality of control functions to control an operation of the rotating electrical machine, the restriction unit works to perform a restriction task to restrict at least one of the control functions in response to a determination that an external charging control mode is entered which electrically charges the energy storage device using an external power supply located outside the system or that an external power feeding control mode is entered which feeds electrical energy from the energy storage device to an external power receiving target located outside the system.

2. The control apparatus as set forth in claim 1, wherein one of the control functions in which a largest load current is delivered from the switching power supply is defined as a specific function, and the restriction unit performs, as the restriction task, a process to decrease an amount of electrical current consumed in the specific function in response to a determination that a condition where the external charging control mode is entered or where the external power feeding control mode is entered is met.

3. The control apparatus as set forth in claim 2, wherein the control functions include an angle detection function to detect an electrical angle of the rotating electrical machine, the restriction unit performs, as the restriction task, a process to deactivate the angle detection function in response to the determination that the condition where the external charging control mode is entered or where the external power feeding control mode is entered is met.

4. The control apparatus as set forth in claim 3, further comprising an excitation signal generator which is supplied with the load current from the switching power supply to produce an alternating current excitation signal, the system includes an angle sensor which modulate the excitation signal as a function of an electrical angle of the rotating electrical machine and output the modulated excitation signal in a form of an angle signal, the angle detection function is to determine an electrical angle of the rotating electrical machine as a function of the angle signal produced by the angle sensor, and the restriction unit performs, as the process to deactivate the angle detection function, a process to stop the excitation signal generator from producing the excitation signal.

5. The control apparatus as set forth in claim 2, further comprising an electrical path through which the load current delivered from the switching power supply flows and a cutoff switch disposed in the electrical path, and wherein the restriction unit, as the restriction task, turns off the cutoff switch in response to the determination that the condition where the external charging control mode is entered or where the external power feeding control mode is entered is met.

6. The control apparatus as set forth in claim 3, further comprising an electrical path through which the load current delivered from the switching power supply flows and a cutoff switch disposed in the electrical path, and wherein the restriction unit, as the restriction task, turns off the cutoff switch in response to the determination that the condition where the external charging control mode is entered or where the external power feeding control mode is entered is met.

7. The control apparatus as set forth in claim 4, further comprising an electrical path through which the load current delivered from the switching power supply flows and a cutoff switch disposed in the electrical path, and wherein the restriction unit, as the restriction task, turns off the cutoff switch in response to the determination that the condition where the external charging control mode is entered or where the external power feeding control mode is entered is met.

8. The control apparatus as set forth in claim 1, further comprising a microcomputer which works to produce switching commands for upper- and lower-arm switches installed in the inverter, the microcomputer has, as one of the control functions, a command generation function to produce the switching commands to drive the rotating electrical machine, and the restriction unit performs, as the restriction task, a process to deactivate the command generation function of the microcomputer in response to the determination that the condition where the external charging control mode is entered or where the external power feeding control mode is entered is met.

9. The control apparatus as set forth in claim 8, further comprising an electrical path through which the load current delivered from the switching power supply flows and a cutoff switch disposed in the electrical path, and wherein the restriction unit, as the restriction task, turns off the cutoff switch in response to the determination that the condition where the external charging control mode is entered or where the external power feeding control mode is entered is met.

10. The control apparatus as set forth in claim 1, further comprising a driver which works to drive an upper-arm switch and a lower-arm switch installed in the inverter, the driver is designed to have, as the control functions, a drive function which turns on or off the upper- and lower-arm switches and an off-hold function which keeps the upper-arm and lower-arm switches off, and the restriction unit performs, as the restriction task, a process to deactivate the control functions of the driver other than the off-hold function in response to the determination that the condition where the external charging control mode is entered or where the external power feeding control mode is entered is met.

11. The control apparatus as set forth in claim 10, further comprising an electrical path through which the load current delivered from the switching power supply flows and a cutoff switch disposed in the electrical path, and wherein the restriction unit, as the restriction task, turns off the cutoff switch in response to the determination that the condition where the external charging control mode is entered or where the external power feeding control mode is entered is met.

12. The control apparatus as set forth in claim 1, further comprising an electrical path through which the load current delivered from the switching power supply flows and a cutoff switch disposed in the electrical path, and wherein the restriction unit, as the restriction task, turns off the cutoff switch in response to the determination that the condition where the external charging control mode is entered or where the external power feeding control mode is entered is met.

13. The control apparatus as set forth in claim 1, wherein the system includes an external charging mechanism and a microcomputer, the external charging mechanism working to connect the external power supply or the external power receiving target to a neutral point of the armature windings, the microcomputer working to produce switching commands for an upper-arm switch and a lower-arm switch installed in the inverter, and wherein the microcomputer has, as the control functions, a drive function which produces the switching commands to drive the rotating electrical machine and a voltage conversion function that generates the switching commands to step-up voltage of a charging power inputted from the external power supply through the neutral point in the external charging control mode or step-down voltage of electrical power supplied to the external power receiving target through the neutral point in the external power feeding control mode, and the restriction unit performs, as the restriction task, a process to deactivate the drive function while maintaining the voltage conversion function in response to the determination that the condition where the external charging control mode is entered or where the external power feeding control mode is entered is met.

14. A program for a control apparatus used in a system which includes an energy storage device, an inverter connected to the energy storage device, and a rotating electrical machine equipped with armature windings connected to the inverter, wherein the control apparatus includes a switching power supply which is equipped with a switch and works to control a switching operation of the switch to output a load current, the control apparatus is configured to use a load current delivered from the switching power supply to perform a plurality of control functions to control an operation of the rotating electrical machine, and the program instructs a computer to perform a restriction task to restrict at least one of the control functions in response to a determination that an external charging control mode is entered which electrically charges the energy storage device using an external power supply located outside the system or that an external power feeding control mode is entered which feeds electrical energy from the energy storage device to an external power receiving target located outside the system.

* * * * *